Patented Feb. 13, 1923.

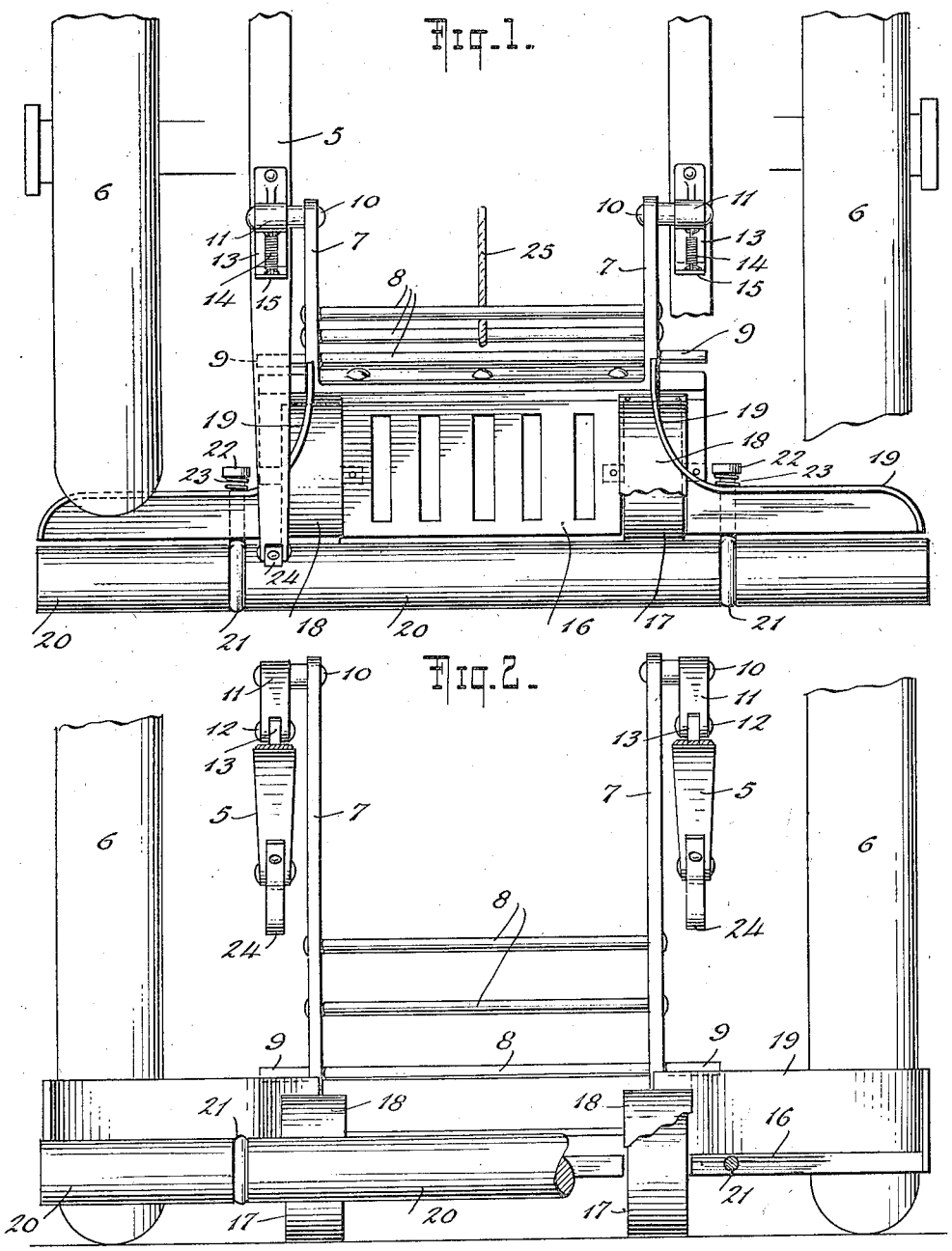

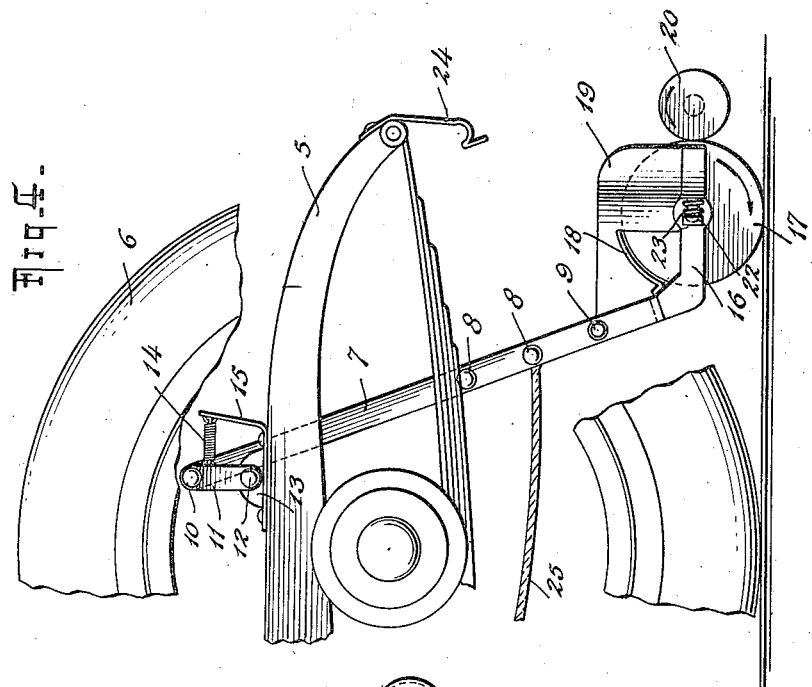
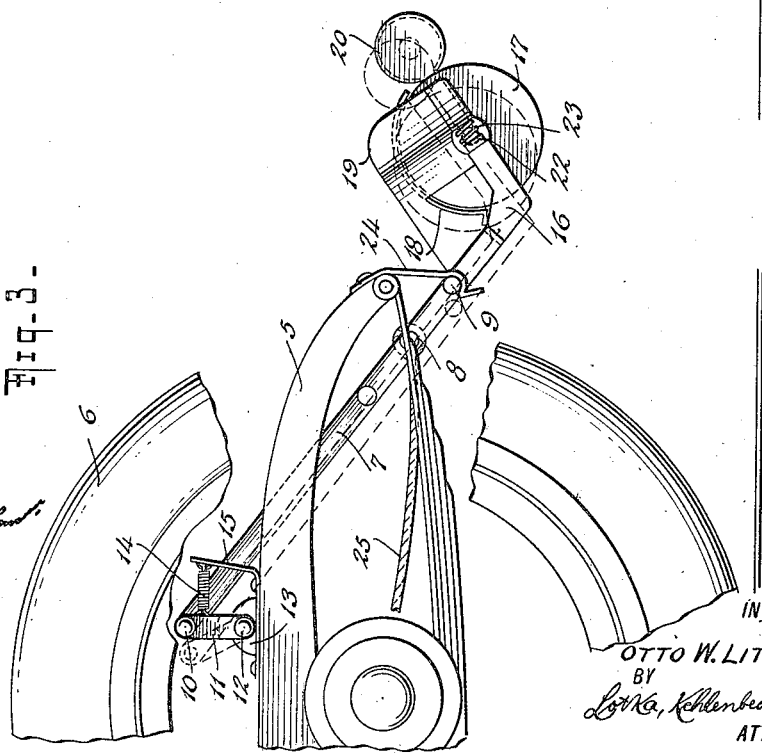

1,444,973

UNITED STATES PATENT OFFICE.

OTTO W. LITZENBERG, OF NEW YORK, N. Y.

FENDER.

Application filed August 1, 1922. Serial No. 578,913.

*To all whom it may concern:*

Be it known that I, OTTO W. LITZENBERG, a citizen of Germany, and resident of the borough of Manhattan, city, county, and State of New York, have invented certain new and useful Improvements in Fenders, of which the following is a specification.

My invention relates to fenders and more particularly to that type which is designed to prevent persons struck by a vehicle from being run over thereby and has for its object to provide a simple and efficient device of this character which is primarily adapted for combination with an automobile. Other more specific objects of the invention will appear from the description hereinafter and the features of novelty will be pointed out in the appended claims.

In the accompanying drawings, which illustrate an example of the invention without defining its limits, Fig. 1 is a plan view; Fig. 2 is a front elevation and Figs. 3 and 4 are side elevations showing the fender in its inoperative and operative positions respectively.

The drawings include the front portion of an automobile chassis 5 and a fragmentary illustration of the wheels 6 mounted thereon, it being understood that these elements are intended to exemplify an automobile of conventional type and construction. The fender itself comprises a supporting frame consisting of side-bars 7 and cross-bars 8, one of which is extended outwardly beyond the side-bars as indicated at 9 for the purpose to be more fully set forth hereinafter. At their upper ends the side-bars 7 are pivotally connected at 10 with the one end of links 11, which at their other ends are pivotally connected at 12 with suitable brackets 13 secured in any convenient manner upon the chassis 5 as shown in the drawings; springs 14 attached to lugs 15 projecting upwardly from said chassis and to said links 11 maintain the latter normally in upright positions and return them thereto as will appear more fully further on in the description.

At their lower ends the side-bars 7 carry a forwardly extending platform 16 which, for the purpose of reducing the dead weight may be made in the form of a grid as shown; this platform is provided with wheels 17 suitably journalled thereon and preferably covered by means of guards 18 to prevent interference therewith and to prevent said wheels from inflicting injury upon a person picked up by the fender. In the preferred construction a suitable guard rail 19 is located upon the platform 16 as shown best in Fig. 1; in addition a roller 20 extends across the front edge of the platform 16 in surface contact with the wheels 17. The roller 20 is journalled in bearing members 21 slidably mounted upon the platform 16 and having heads 22 against which springs 23 exert a pressure whereby said roller 20 is maintained in engagement with the wheels 17; in the preferred arrangement both the wheels 17 and roller 20 are provided with rubber coverings or the like. The fender is normally maintained in an inoperative or raised position by means of hooks 24 secured to and depending from the chassis 5 and adapted to engage the projecting ends 9 of one cross-bar 8 as shown in Fig. 3; a cord 25 or its equivalent extending to a point within easy reach of the operator and suitably connected with one of said cross-bars 8 may be provided for throwing said fender into its lower operative position at will.

In practice, assuming the vehicle to be travelling in a given direction and with the parts in the positions shown in Fig. 3, the roller 20 will be in advance of the front end of said vehicle at a height about level with the hubs of the wheels 6. If a person is now struck the pressure created by the impact will push the fender rearwardly to the position indicated by dotted lines in Fig. 3, the links 11 presenting a yielding resistance under the action of the springs 14, until the ends 9 of the cross-bar 8 are freed from the hooks 24. The moment this is accomplished the fender by its own weight and under the influence of the aforesaid impact, instantly drops to its operative position with the wheels 17 in contact with the roadway and picks up the person struck by the vehicle. As soon as the wheels 17 strike the roadway, the roller 20 immediately begins to rotate in a direction toward the platform 16 whereby said person is gently and efficiently pushed upon said platform completely out of harm's way and carried thereby, without injury, until the vehicle is brought to a stop.

The construction of the fender and its normal position on the vehicle is such that comparatively little effort is required to cause it to quickly assume its operative position in which it operates with a minimum of shock to efficiently pick up the person struck; the possibility of injury to the latter is thereby reduced to a minimum and the margin of safety to pedestrians, particularly in localities whereby crowded vehicular traffic conditions exist, is increased to a maximum extent. The fender may be manually adjusted to its operative position, at will, by simply exerting a pull upon the cord 25 or its equivalent sufficient to disengage the projecting ends 9 from the hooks 24 in the same way as previously described. The device is easily reset to its inoperative position by simply lifting the fender until the ends 9 again engage the hooks 24; the springs 14 are of sufficient tension to maintain the ends 9 in engagement with the hooks 24 without, however, developing any material resistance to the disengagement of these elements when occasion demands.

The fender may be easily attached in place upon existing automobiles without requiring any structural changes thereon and presents an attractive appearance while at the same time obviating the possibility of the vehicle becoming an agency of harm. The device is simple in construction and operation and requires no skilled attention either to install or operate.

Various changes in the specific form shown and described may be made within the scope of the claims without departing from the spirit of the invention.

I claim:

1. The combination of an automobile chassis and a fender comprising pivoted links yieldingly mounted on said chassis, a supporting frame pivoted to said links, a platform carried by said frame, wheels on said platform adapted to engage the roadway, a roller journalled on said platform in surface engagement with said wheels and rotatable in a direction toward the platform, projections on said frame and resilient hooks depending from said chassis and arranged to engage said projections for maintaining said fender in a raised, inoperative position.

2. The combination of an automobile chassis, links pivoted thereon, lugs fixed on said chassis, springs connected with said lugs and links whereby the latter are yieldingly mounted upon said chassis, a supporting frame pivotally connected with said links, a platform carried by said frame, wheels on said platform adapted to engage the roadway, a reverse acting roller on said platform in front of and in surface engagement with said wheels, guards on said platform covering said wheels, projections and holders located on said fender and chassis and arranged to engage each other for maintaining said fender in a raised position and adapted, when disconnected, to permit said fender to drop.

3. The combination of a chassis and a vehicle fender comprising a supporting frame, means connected therewith for mounting said frame upon said chassis in a manner to be yieldingly pressed forward, said frame being arranged and suspended in a slanting inoperative position at an angle of approximately 45° to the roadway, a platform carried by said frame, wheels mounted upon said platform, a reverse acting roller journalled on said platform in front of and in surface engagement with said wheels, guard rails on said platform, projections on said fender and holders depending from said chassis and arranged to engage said projections for maintaining said frame in its raised, inoperative position and for permitting it to drop when occasion demands and a cord connected with said frame and extending to within easy reach of an operator for disconnecting said projections and holders at will.

4. The combination of an automobile chassis, a fender, means for yieldingly mounting said fender on said chassis and for pressing it forwardly, a roller extending across the front of said fender, means whereby said roller is rotated in a direction contrary to the direction of travel of the automobile chassis, projections on said fender and holders on said chassis arranged to engage said projections for maintaining said fender in an inoperative position and for permitting said fender to drop to its operative position as occasion demands.

In testimony whereof I have hereby signed this specification.

OTTO W. LITZENBERG.